(12) United States Patent
Nishioka et al.

(10) Patent No.: US 12,027,082 B2
(45) Date of Patent: Jul. 2, 2024

(54) DISPLAY METHOD AND DISPLAY SYSTEM

(71) Applicant: SEIKO EPSON CORPORATION, Tokyo (JP)

(72) Inventors: Hiroki Nishioka, Suwa (JP); Kunio Yoneno, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/322,646

(22) Filed: May 24, 2023

(65) Prior Publication Data

US 2023/0386374 A1 Nov. 30, 2023

(30) Foreign Application Priority Data

May 24, 2022 (JP) .................................. 2022-084432

(51) Int. Cl.
| | |
|---|---|
| *G09G 3/00* | (2006.01) |
| *G06F 3/01* | (2006.01) |
| *G08B 13/14* | (2006.01) |
| *G08B 21/02* | (2006.01) |
| *G06F 3/04845* | (2022.01) |
| *H04N 21/218* | (2011.01) |

(52) U.S. Cl.
CPC ............. *G09G 3/002* (2013.01); *G06F 3/011* (2013.01); *G08B 13/1436* (2013.01); *G08B 21/02* (2013.01); *G06F 3/04845* (2013.01); *G09G 2320/068* (2013.01); *G09G 2340/0492* (2013.01); *G09G 2354/00* (2013.01); *H04N 21/21805* (2013.01)

(58) Field of Classification Search
CPC ............. G09G 3/002; G09G 2320/068; G09G 2340/0492; G09G 2354/00; G06F 3/011; G06F 3/04845; G08B 13/1436; G08B 21/02; H04N 21/21805
USPC .......................................................... 345/156
See application file for complete search history.

(56) References Cited

U.S. PATENT DOCUMENTS

| | | | | |
|---|---|---|---|---|
| 8,751,049 B2* | 6/2014 | Linder | ............... | G06Q 30/0641 345/173 |
| 10,291,848 B2* | 5/2019 | Takahashi | ............... | H04N 5/272 |
| 11,089,266 B2* | 8/2021 | Li | ............... | G06T 13/40 |
| 2002/0046100 A1* | 4/2002 | Kinjo | ............... | G06F 3/0481 705/14.66 |
| 2007/0250868 A1* | 10/2007 | Konno | ............... | H04N 17/045 348/E5.062 |
| 2009/0284714 A1* | 11/2009 | Kogo | ............... | H04N 9/3194 353/98 |
| 2013/0023337 A1* | 1/2013 | Bowers | ............... | G07F 17/3209 463/25 |

(Continued)

FOREIGN PATENT DOCUMENTS

| | | | |
|---|---|---|---|
| JP | 2003-148991 A | 5/2003 | |
| JP | 2012-155654 A | 8/2012 | |

(Continued)

*Primary Examiner* — Tom V Sheng
(74) *Attorney, Agent, or Firm* — Dority & Manning, P.A.

(57) ABSTRACT

A display method includes acquiring output corresponding to a movement direction of a human toward a display position of a display apparatus using a sensor, determining an orientation of a content used for alert based on the output corresponding to the movement direction, and displaying the content in the display position in the orientation using the display apparatus.

7 Claims, 9 Drawing Sheets

(56) References Cited

U.S. PATENT DOCUMENTS

| | | | |
|---|---|---|---|
| 2013/0293586 A1 | 11/2013 | Kaino et al. | |
| 2014/0176599 A1* | 6/2014 | Watanabe | H04N 9/3185 345/619 |
| 2014/0298261 A1* | 10/2014 | Imoto | G06F 3/0485 715/810 |
| 2016/0350621 A1 | 12/2016 | Watanabe et al. | |
| 2020/0093367 A1* | 3/2020 | Dory | A61B 3/0041 |
| 2020/0184932 A1* | 6/2020 | Fujimori | H04N 9/3179 |
| 2022/0083133 A1* | 3/2022 | Ito | G06F 3/013 |

FOREIGN PATENT DOCUMENTS

| | | |
|---|---|---|
| JP | 2014-123277 A | 7/2014 |
| JP | 2016-222408 A | 12/2016 |
| JP | 2019-139622 A | 8/2019 |

\* cited by examiner

FIG. 6

| CONTENT C1 | | | |
|---|---|---|---|
| CONTENT C1_a | CONTENT C1_b | DISPLAY DIRECTION | D1 |
| CAUTION STEPS | WATCH YOUR STEP | DR1 → | |
| CONTENT C2 | | | |
| CONTENT C2_a | CONTENT C2_b | DISPLAY DIRECTION | |
| STEPS AHEAD | ⚠ | ← DR2 | |

DISPLAY METHOD AND DISPLAY SYSTEM

The present application is based on, and claims priority from JP Application Serial Number 2022-084432, filed May 24, 2022, the disclosure of which is hereby incorporated by reference herein in its entirety.

BACKGROUND

1. Technical Field

The present disclosure relates to a display method and a display system.

2. Related Art

In related art, driving of a projector may be controlled based on output of a sensor detecting a motion of a human. For example, JP-A-2016-222408 discloses an alert system including a distance measuring device, a waiting position indication device, and a projection device.

In the system disclosed in JP-A-2016-222408, the distance measuring device measures a distance between an elevator user and an elevator door, the waiting position indication device indicates a waiting position in an elevator hall to the elevator user based on the measured distance of the distance measuring device, and the projection device projects an image showing the waiting position onto a floor surface of the elevator hall based on the indication by the waiting position indication device.

In the system disclosed in JP-A-2016-222408, the movement direction of a human approaching the display position of the image is not considered, and it may be difficult to display an image with an appropriate content to the human.

SUMMARY

A display method according to an aspect of the present disclosure includes acquiring output corresponding to a movement direction of a human toward a display position where a display apparatus displays an image based on a content using at least one sensor, determining an orientation of the image used for alert based on the output corresponding to the movement direction, and displaying the image in the display position in the orientation using the display apparatus.

A display system according to an aspect of the present disclosure includes a display apparatus, at least one sensor outputting output corresponding to a movement direction of a human toward a display position where the display apparatus displays an image based on a content, and a control apparatus controlling operation of the display apparatus based on the output corresponding to the movement direction, wherein the control apparatus executes acquiring the output corresponding to the movement direction from the at least one sensor, determining an orientation of an image used for alert based on the movement direction, and displaying the image in the display position in the orientation using the display apparatus.

BRIEF DESCRIPTION OF THE DRAWINGS

FIG. 6 is a diagram for explanation of contents used for display.

DESCRIPTION OF EXEMPLARY EMBODIMENTS

Figure 1:
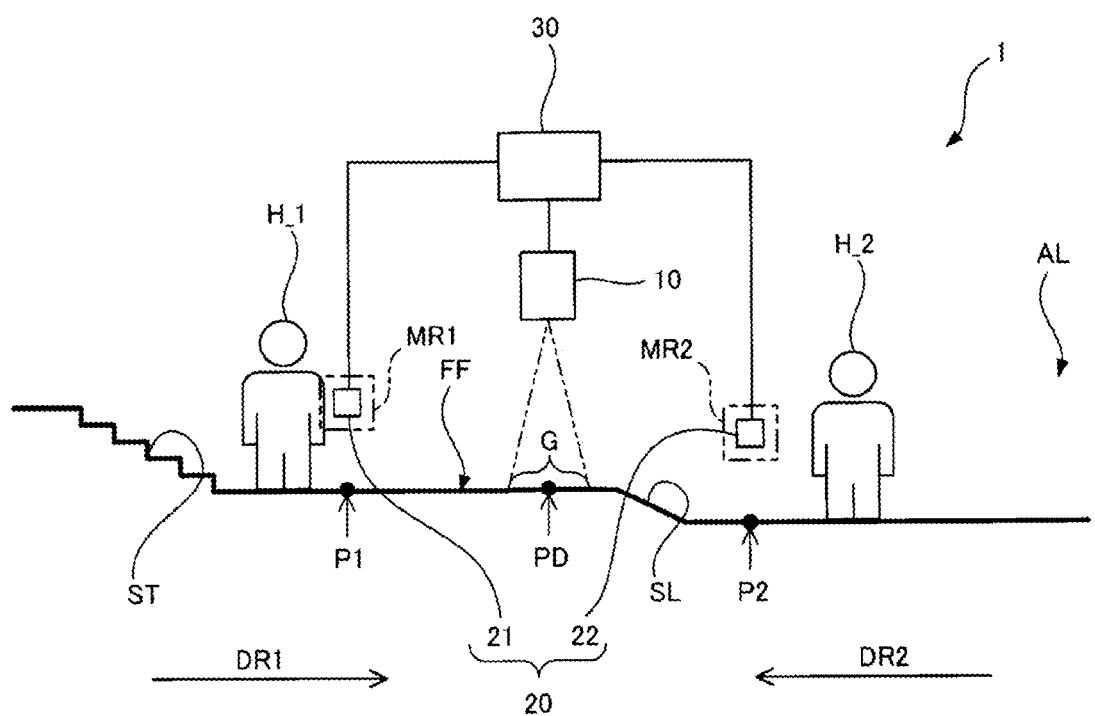
FIG. 1 is a schematic diagram of a display system according to a first embodiment.

As below, preferred embodiments of the present disclosure will be explained with reference to the accompanying drawings. In the drawings, the dimensions and scales of the respective parts are appropriately different from real ones and some parts are schematically shown to facilitate understanding. Further, the scope of the present disclosure is not limited to these embodiments unless there is particular description limiting the present disclosure.

1. First Embodiment

1-1. Outline of Display System

FIG. 1 is a schematic diagram of a display system 1 according to a first embodiment. The display system 1 is a system displaying an image G in a display position PD using a display apparatus 10. More specifically, when a human H_1 moves from a first position P1 to the display position PD, the display system 1 displays the image G in an orientation easily viewable for the human H_1 and, on the other hand, when a human H_2 moves from a second position P2 to the display position PD, displays the image G in an orientation easily viewable for the human H_2. Note that, hereinafter, the respective human H_1 and human H_2 may be referred to as "human H".

The respective first position P1, second position P2, and display position PD are positions in the traveling direction of the human H. The display position PD is a position between the first position P1 and the second position P2. The display position PD is e.g., the center of the image G.

In the example shown in FIG. 1, the display system 1 alerts the human H coming down an aisle AL using the image G. Here, the length direction of the aisle AL is the traveling direction of the human H. A movement direction DR1 of the human H_1 and a movement direction DR2 of the human H_2 are different from each other and, in the drawing, opposite directions to each other.

A slope SL and steps ST are provided on a floor FF in the middle in the length direction of the aisle AL. The display position PD is set on the floor surface FF in a location between the slope SL and the steps ST and adjacent to the slope SL in the length direction of the aisle AL. The first position P1 is a position between the steps ST and the display position PD. As described above, the respective display position PD and first position P1 are located on the left in FIG. 1 with respect to the slope SL. On the other hand, the second position P2 is located on the right in FIG. 1 with respect to the slope SL. Accordingly, the slope SL is located between the display position PD and the second position P2.

Note that the form of the aisle AL including a width or a shape is not limited to the example shown in FIG. 1, but may be arbitrary. Further, the display position PD is not limited to the example shown in FIG. 1, but may be, e.g., a position apart from the slope SL, a position on a screen provided in the aisle AL, or a position on a left or right wall surface or a ceiling surface of the aisle AL.

The display system 1 includes the display apparatus 10, a sensor 20, and a control apparatus 30. As below, these will be briefly explained with reference to FIG. 1.

The display apparatus 10 is a projector displaying the image G in the display position PD under control of the control apparatus 30. The detailed configuration of the display apparatus 10 will be explained later with reference to FIG. 2.

The sensor 20 is a sensor outputting in response to the movement direction of the human H from the first position P1 or the second position P2 toward the display position PD. In the example shown in FIG. 1, the sensor 20 includes a first sensor 21 detecting passing of the human H through the first position P1 and a second sensor 22 detecting passing of the human H through the second position P2.

The respective first sensor 21 and second sensor 22 are sensors such as photoelectronic sensors and attached to one wall of the pair of left and right walls of the aisle AL. Though not shown in the drawing, the respective first sensor 21 and second sensor 22 have light emitting elements including LEDs (light-emitting diodes) or laser diodes and light receiving elements including phototransistors or photodiodes. The light emitted by the light emitting element may be visible light or infrared light. Further, the respective first sensor 21 and second sensor 22 may have circuits for amplification sensitivity adjustment or output polarity setting in addition to the light emitting elements and the light receiving elements. In the example shown in FIG. 1, a reflector MR1 is provided to face the first sensor 21 and a reflector MR2 is provided to face the second sensor 22 on the other wall of the pair of walls. The respective reflectors MR1, MR2 are structures having light reflectivity such as corner cube arrays. The reflector MR1 reflects the light from the light emitting element of the first sensor 21 toward the light receiving element of the first sensor 21. Similarly, the reflector MR2 reflects the light from the light emitting element of the second sensor 22 toward the light receiving element of the second sensor 22.

In the above described sensor 20, when no object is present in the first position P1, the light from the light emitting element of the first sensor 21 is reflected by the reflector MR1 and received by the light receiving element of the first sensor 21. On the other hand, when an object is present in the first position P1, the light from the light emitting element of the first sensor 21 is shielded by the object and not received by the light receiving element of the first sensor 21. For example, when no object is present in the first position P1, the first sensor 21 outputs a high-level signal and, when an object is present in the first position P1, outputs a low-level signal. The low-level signal output when an object is present in the first position P1 corresponds to a first signal. Similarly, for example, when no object is present in the second position P2, the second sensor 22 outputs a high-level signal and, when an object is present in the second position P2, outputs a low-level signal. The low-level signal output when an object is present in the second position P2 corresponds to a second signal.

In the above described sensor 20, when the human H_1 moves from the first position P1 to the second position P2 via the display position PD, the output of the first sensor 21 changes with the timing of the human H_1 passing through the first position P1, and then, the output of the second sensor 22 changes with the timing of the human H_1 passing through the second position P2. On the other hand, when the human H_2 moves from the second position P2 to the first position P1 via the display position PD, the output of the second sensor 22 changes with the timing of the human H_2 passing through the second position P2, and then, the output of the first sensor 21 changes with the timing of the human H_2 passing through the first position P1.

Therefore, when no one is present within a region between the first position P1 and the second position P2, and then, the human H enters the region, the output of one sensor of the first sensor 21 and the second sensor 22 changes before the output of the other sensor changes. The movement direction of the human H may be determined by detection of the output change of the one sensor. In this manner, the movement direction of the human H may be determined based on the first sensor 21 and the second sensor 22.

Note that the respective reflectors MR1, MR2 are provided as necessary or may be omitted. In this case, for example, the other wall functions as the reflectors MR1, MR2. There is an advantage that detection accuracy of the sensor 20 is easily increased when the structures having light reflectivity such as corner cube arrays are used as the reflectors MR1, MR2.

The control apparatus 30 is an apparatus controlling operation of the display apparatus 10 based on the output of the sensor 20. Here, the control apparatus 30 acquires the output corresponding to the movement direction DR1 or the movement direction DR2 of the human H toward the display position PD using the sensor 20. Further, the control apparatus 30 determines an orientation of a content used for alert based on the output corresponding to the movement direction DR1 or the movement direction DR2. In the embodiment, the control apparatus 30 determines not only the orientation but also the content based on the output corresponding to the movement direction DR1 or the movement direction DR2. Furthermore, the control apparatus 30 displays the content as the image G in the orientation in the display position PD using the display apparatus 10. The detailed configuration of the control apparatus 30 will be explained later with reference to FIG. 2.

In the display system 1 having the above described configuration, the respective content of the image G used for alert and display orientation thereof are determined in response to the movement direction DR1 or DR2 of the human H toward the display position PD. Accordingly, the image G may be displayed in the appropriate orientation and with the appropriate content to the human H.

1-2. Configuration of Display System

Figure 2:
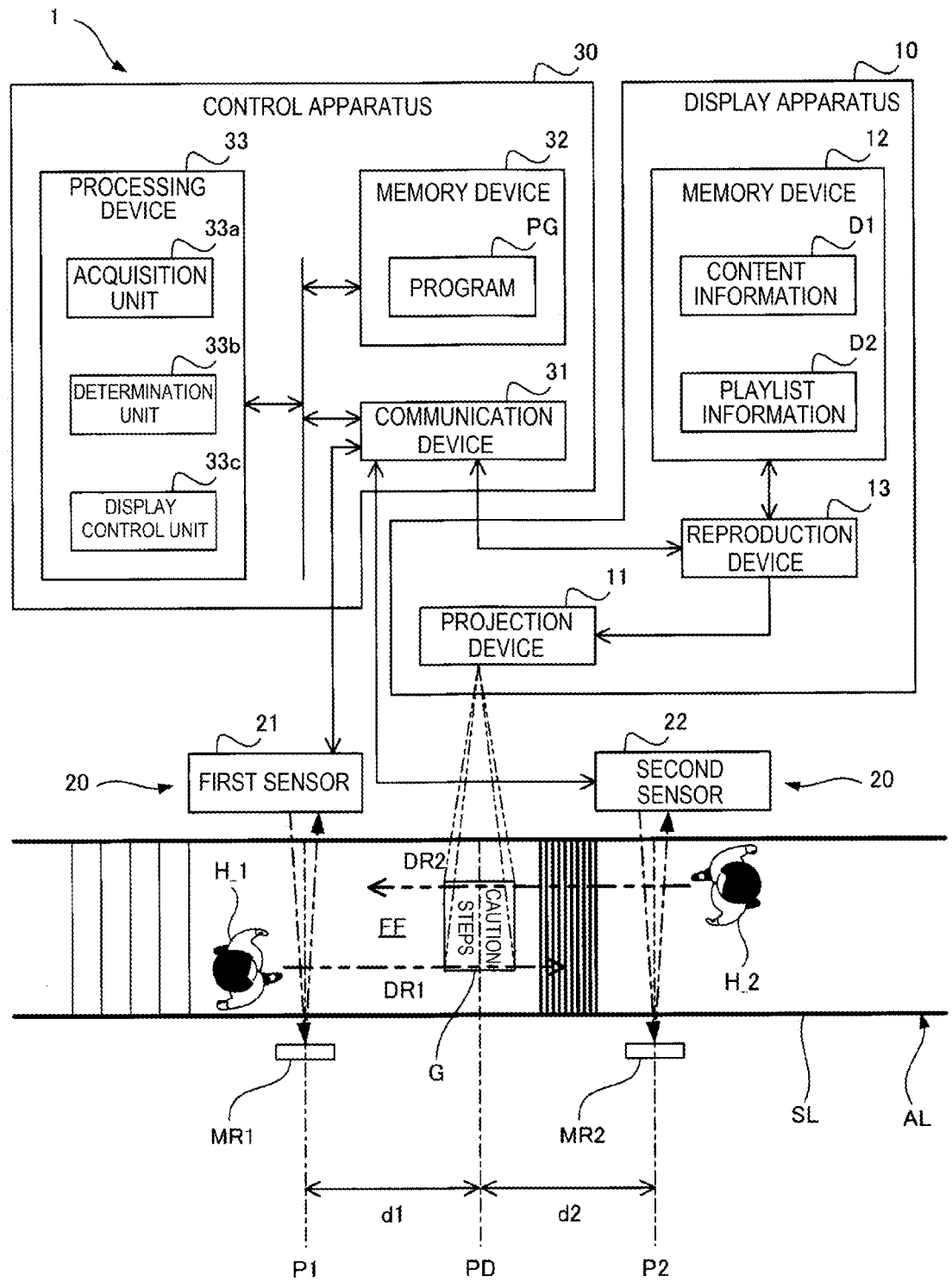
FIG. 2 is a block diagram showing the display system according to the first embodiment.

FIG. 2 is a block diagram showing the display system 1 according to the first embodiment. In FIG. 2, not only the electrical configuration of the display system 1 but also a view of the aisle AL as seen from vertically above are shown. As described above, the display system 1 includes the display apparatus 10, the sensor 20, and the control apparatus 30. As below, the display apparatus 10 and the control apparatus 30 will be described in detail with reference to FIG. 2.

As shown in FIG. 2, the display apparatus 10 includes a projection device 11, a memory device 12, and a reproduction device 13.

The projection device 11 is a mechanism projecting the image G in the display position PD. Though not shown in the drawing, the projection device 11 has e.g., an image processing circuit, a light source, a light modulator, and a projection system.

The image processing circuit of the projection device 11 is a circuit generating an image signal for driving the light modulator using image information within content information D1 from the reproduction device 13. Specifically, the image processing circuit has a frame memory, and generates the image signal by loading the image information within the content information D1 in the frame memory and appropriately executing various kinds of processing including resolution conversion processing, resize processing, and distortion correction processing.

The light source of the projection device 11 includes e.g., a halogen lamp, a xenon lamp, a super high-pressure mercury lamp, an LED (Light Emitting Diode), or a laser beam source. For example, the light source outputs a white light or respectively outputs red, green, and blue lights. When the light source outputs a white light, the light output from the light source has a luminance distribution with reduced variations by an optical integration system (not shown), and the light is separated into red, green, and blue lights by a color separation system (not shown) and enter the light modulator of the projection device 11.

The light modulator of the projection device 11 includes three light modulation elements provided to correspond to the above described red, green, and blue. The respective three light modulation elements include e.g., transmissive liquid crystal panels, reflective liquid crystal panels, or DMDs (digital mirror devices). The three light modulation elements respectively modulate the red, green, and blue lights based on the image signal from the image processing circuit of the projection device 11 and generate image lights of the respective colors. The image lights of the respective colors are combined by a light combining system (not shown) into a full-color image light.

The projection system of the projection device 11 focuses and projects the above described full-color image light on a projection surface. The projection system is e.g., an optical system including a projection lens. The projection system may include e.g., a zoom lens or a focus lens in addition to the projection lens.

The memory device 12 is a device storing the content information D1 and playlist information D2. The memory device 12 includes e.g., a hard disk drive or a semiconductor memory. Note that part or all of the information stored in the memory device 12 may be stored in advance or acquired from an external device coupled to the memory device 12 via wireless or wired connection. Further, the memory device 12 may be a portable memory card or memory disk.

The content information D1 is image information on the content of the image G. The content information D1 contains image information on a plurality of types of contents used for the image G. The image information on the plurality of types of contents is e.g., image information on display for alert to the human H. Here, the image information may be still image information or moving image information. Further, information such as sound information for alert may be added to the image information. The content information D1 may contain image information representing a black image for a view not displaying the image G in addition to the information representing the image for alert to the human H. Specific examples of the content information D1 will be explained later with reference to FIG. 6.

The playlist information D2 is information on a playlist in which one or more reproduction objects, a reproduction order, reproduction time lengths, etc. of the image information contained in the content information D1 are described. The playlist information D2 contains information on one or more different playlists of the reproduction objects, the reproduction order, and the reproduction time lengths. Note that the playlist information D2 is used as necessary or may be omitted. In this case, the control apparatus 30 may execute processing of determining the reproduction object, the reproduction order, the reproduction time length, etc. of the information within the content information D1 and control driving of the reproduction device 13 based on the determination result. There is an advantage that drive control of the reproduction device 13 by the control apparatus 30 is simplified using the playlist information D2.

The reproduction device 13 is a device reading and transmitting information stored in the memory device 12 to the projection device 11 under control of the control apparatus 30. Specifically, the reproduction device 13 appropriately transmits the information within the content information D1 to the projection device 11 based on the playlist information D2 under control of the control apparatus 30. The reproduction device 13 is e.g., a device such as a memory card reader, a personal computer, or a DVD (Digital Versatile Disk) player. Note that the reproduction device 13 may be integrally formed with the projection device 11 or formed as a part of the control apparatus 30. When the reproduction device 13 is formed as a part of the control apparatus 30, also, the above described memory device 12 may be formed as a part of the control apparatus 30.

As shown in FIG. 2, the control apparatus 30 includes a communication device 31, a memory device 32, and a processing device 33. These are communicably coupled to one another via a common bus.

The communication device 31 is a device that can communicate with the respective display apparatus 10 and sensor 20 via wired or wireless connection. Specifically, the communication device 31 has an interface circuit for communication with the display apparatus 10 and an interface circuit for communication with the sensor 20. For example, the communication device 31 includes a wired communication device such as a wired LAN (Local Area Network), a USB (Universal Serial Bus), and an HDMI (Hight Definition Multimedia Interface) and a wireless communication device such as a wireless LAN including LPWA (Low Power Wide Area) and WiFi or Bluetooth. "HDMI", "WiFi", and "Bluetooth" are respectively registered trademarks.

The memory device 32 is a device storing a program PG executed by the processing device 33 and various kinds of information processed by the processing device 33. The memory device 32 includes e.g., a hard disk drive or a semiconductor memory. Note that part or all of the information stored in the memory device 32 may be stored in advance or acquired from an external device via the above described communication device 31.

The processing device 33 is a processing device having a function of controlling operation of the respective units of the control apparatus 30 and a function of processing various kinds of data. For example, the processing device 33 includes e.g., one or more processors such as CPUs (Central Processing Units). Note that part or all of the processing device 33 may be realized by hardware such as a DSP (Digital Signal Processor), an ASIC (Application Specific Integrated Circuit), a PLD (Programmable Logic Device), or an FPGA (Field Programmable Gate Array).

The processing device 33 executes the program PG, and thereby, functions as an acquisition unit 33a, a determination unit 33b, and a display control unit 33c.

The acquisition unit 33a acquires output corresponding to the movement direction DR1 or the movement direction DR2 of the human H passing through the first position P1 or the second position P2 toward the display position PD.

Here, when the human H passes through the first position P1, the acquisition unit 33a stores a first time t1 when acquiring the output of the first sensor 21 in the memory device 32. The first time t1 stored in the memory device 32 is discarded from the memory device 32 when the acquisition unit 33a acquires the output of the second sensor 22 or an ineffective time over a predetermined time elapses after the output of the first sensor 21 is acquired. Similarly, when the human H passes through the second position P2, the acquisition unit 33a stores a second time t2 when acquiring the output of the second sensor 22 in the memory device 32. The second time t2 stored in the memory device 32 is discarded from the memory device 32 when the acquisition unit 33a acquires the output of the first sensor 21 or an ineffective time over a predetermined time elapses after the output of the second sensor 22 is acquired.

Therefore, when the first time t1 is stored in the memory device 32 within a period of the ineffective time, the movement of the human H_1 from the first position P1 toward the display position PD in the movement direction DR1 may be determined. Or, when the second time t2 is stored in the memory device 32 within a period of the ineffective time, the movement of the human H_2 from the second position P2 toward the display position PD in the movement direction DR2 may be determined.

A distance d1 between the first position P1 and the display position PD is not particularly limited, but preferably from 1 m to 5 m, for example. When the distance d1 is too short, it may be difficult to display the image G with appropriate timing to the human H_1 depending on the movement speed of the human H_1. On the other hand, when the distance d1 is too long, it may be highly possible that a period for unnecessary display of the image G is longer and a plurality of humans H are present within the region between the first position P1 and the second position P2, and the configuration for displaying the appropriate image G may be complex.

Similarly, a distance d2 between the second position P2 and the display position PD is not particularly limited, but preferably from 1 m to 5 m, for example. When the distance d2 is too short, it may be difficult to display the image G with appropriate timing to the human H_2 depending on the movement speed of the human H_2. On the other hand, when the distance d2 is too long, it may be highly possible that a period for unnecessary display of the image G is longer and a plurality of humans H are present within the region between the first position P1 and the second position P2, and the configuration for displaying the appropriate image G may be complex. Note that the distance d1 and the distance d2 may be equal to or different from each other.

The determination unit 33b determines the content used for alert and the display orientation of the content as the image G based on the output from the sensor 20. More specifically, when the first time t1 is stored in the memory device 32, the determination unit 33b determines that the human H_1 is moving in the movement direction DR1, determines the content necessary for the human H_1, and determines the orientation of the content easily viewable from the movement direction DR1. On the other hand, when the second time t2 is stored in the memory device 32, the determination unit 33b determines that the human H_2 is moving in the movement direction DR2, determines the content necessary for the human H_2, and determines the orientation of the content easily viewable from the movement direction DR2.

The display control unit 33c displays the content determined by the determination unit 33b as the image G in the display position PD in the orientation determined by the determination unit 33b using the display apparatus 10. Specifically, the display control unit 33c designates a playlist within the playlist information D2 for the reproduction device 13 based on the determination result by the determination unit 33b, and thereby, controls the display apparatus 10 to display the desired content as the image G in the desired orientation.

1-3. Display Method

Figure 3:
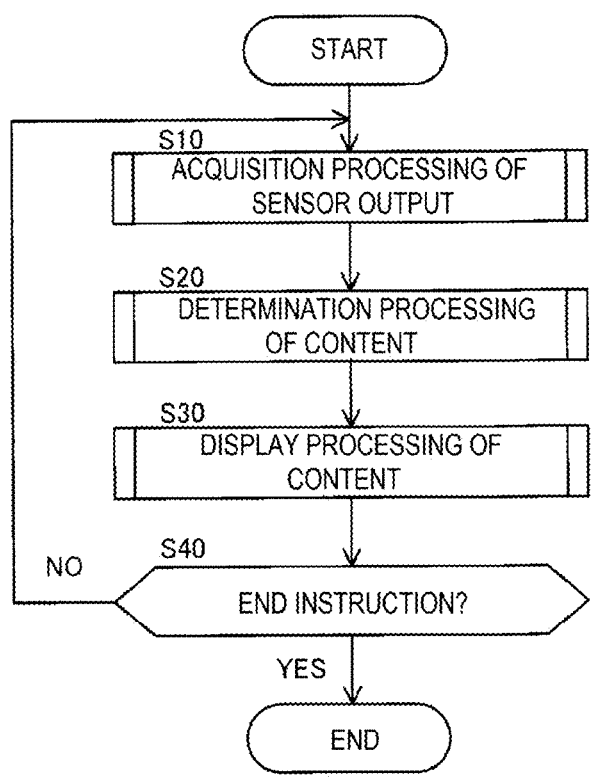
FIG. 3 is a flowchart of a display method according to the first embodiment.

FIG. 3 is a flowchart of a display method according to the first embodiment. The display method is performed using the above described display system 1. In the display system 1, first, as shown in FIG. 3, at step S10, the acquisition unit 33a acquires the output corresponding to the movement direction of the human H toward the display position PD of the display apparatus 10. The details of the acquisition processing will be described later with reference to FIG. 4.

Then, at step S20, the determination unit 33b determines the orientation of the content used for alert based on the output corresponding to the movement direction. The details of the determination processing will be described later with reference to FIG. 5.

Then, at step S30, the display control unit 33c displays the content determined at step S20 as the image G in the orientation determined at step S20 in the display position PD. The details of the display processing will be described later with reference to FIG. 6.

Then, at step S40, the processing device 33 determines whether there is an end instruction. When there is no end instruction (S40: NO), the processing device 33 goes to the above described step S10 and, on the other hand, when there is an end instruction (S40: YES), ends the processing.

Figure 4:
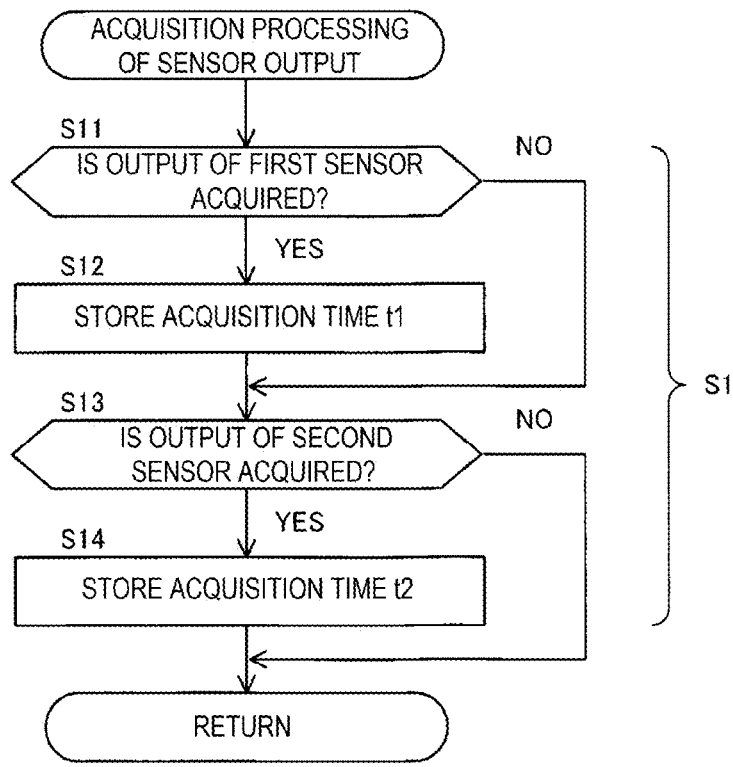
FIG. 4 is a flowchart of acquisition processing of sensor output in the display method according to the first embodiment.

FIG. 4 is a flowchart of acquisition processing of sensor output in the display method according to the first embodiment. At the above described step S10 in FIG. 3, as shown in FIG. 4, first, at step S11, whether the acquisition unit 33a acquires the output of the first sensor 21 is determined. The determination is made based on whether the output of the first sensor 21 changes, for example. When the acquisition unit 33a acquires the output of the first sensor 21 (S11: YES), at step S12, the acquisition unit 33a stores the first time t1 of the acquisition in the memory device 32.

After step S12 or when the acquisition unit 33a does not acquire the output of the first sensor 21 (S11: NO), at step S13, whether the acquisition unit 33a acquires the output of the second sensor 22 is determined. The determination is made based on whether the output of the second sensor 22 changes, for example. When the acquisition unit 33a acquires the output of the second sensor 22 (S12: YES), at step S14, the acquisition unit 33a stores the second time t2 of the acquisition in the memory device 32.

After step S14 or when the acquisition unit 33a does not acquire the output of the second sensor 22 (S12: NO), the processing device 33 goes to step S20 in FIG. 3.

Figure 5:
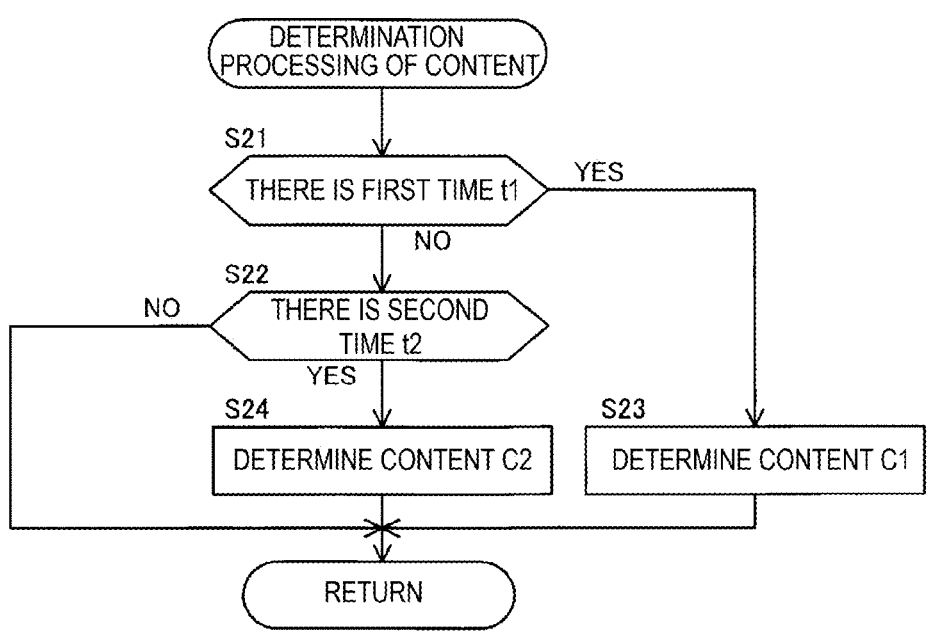
FIG. 5 is a flowchart of determination processing of a content in the display method according to the first embodiment.

FIG. 5 is a flowchart of determination processing of a content in the display method according to the first embodiment. At the above described step S20 in FIG. 3, as shown in FIG. 5, first, the determination unit 33*b* determines whether there is the first time t1. The determination is made based on whether the first time t1 is stored in the memory device 32, for example. When there is the first time t1 (S21: YES), at step S23, the determination unit 33*b* determines a content C1 as the content of the image G. The content C1 is for display for alerting the human H_1 and set in the orientation easily viewable by the human H_1. The specific example of the content C1 will be described later with reference to FIG. 6.

When there is no first time t1 (S21: NO), at step S22, the determination unit 33*b* determines whether there is the second time t2. The determination is made based on whether the second time t2 is stored in the memory device 32, for example. When there is the second time t2 (S22: YES), at step S24, the determination unit 33*b* determines a content C2 as the content of the image G. The content C2 is for display for alerting the human H_2 and set in the orientation easily viewable by the human H_2. The specific example of the content C2 will be described later with reference to FIG. 6.

After the above described steps S23, S24 or when there is no first time t1 or second time t2 (S22: NO), the processing device 33 goes to the above described step S30 in FIG. 3.

FIG. 6 is a diagram for explanation of contents used for display. In FIG. 6, specific examples of the contents C1, C2 represented by the image information contained in the content information D1 are shown.

As shown in FIG. 6, the content C1 is for display for alerting the human H_1 to a level difference due to the slope SL. In the example shown in FIG. 6, the content C1 includes contents C1_a and C1_b. The content C1_a is for display for alerting the human H_1 to a level difference due to the slope SL by characters. The content C1_b is for display for alerting the human H_1 to a level difference due to the slope SL not only by characters but also by a pictogram. When the content C1 is displayed at the above described step S30 in FIG. 3, the orientation of the content C1 is set to an orientation in which the lower end of the image is placed at an anterior side of the traveling direction and the upper end of the image is placed at a posterior side of the traveling direction in the movement direction DR1, and these are displayed in the order of the content C1_a and the content C1_b. Thereby, the characters of the content C1 are displayed for the human H_1 approaching the slope SL in the movement direction DR1 to be readable from the front.

The content C2 is for display for alerting the human H_2 to a level difference due to the steps ST. In the example shown in FIG. 6, the content C2 includes contents C2_a and C2_b. The content C2_a is for display for alerting the human H_2 to a level difference due to the steps ST by characters. The content C2_b is for display for alerting the human H_2 to a level difference due to the steps ST by a pictogram. When the content C2 is displayed at the above described step S30 in FIG. 3, the orientation of the content C2 is set to an orientation in which the lower end of the image is placed at an anterior side of the traveling direction and the upper end of the image is placed at a posterior side of the traveling direction in the movement direction DR2, and these are displayed in the order of the content C2_a and the content C2_b. Thereby, the characters of the content C2_are displayed for the human H_2 approaching the steps ST in the movement direction DR2 to be readable from the front.

Note that the respective contents C1, C2 are not limited to the examples shown in FIG. 6, but arbitrary. Further, the respective contents C1, C2 may be a single type of contents, a plurality of contents including three or more types of contents sequentially switched, or moving images.

Figure 7:
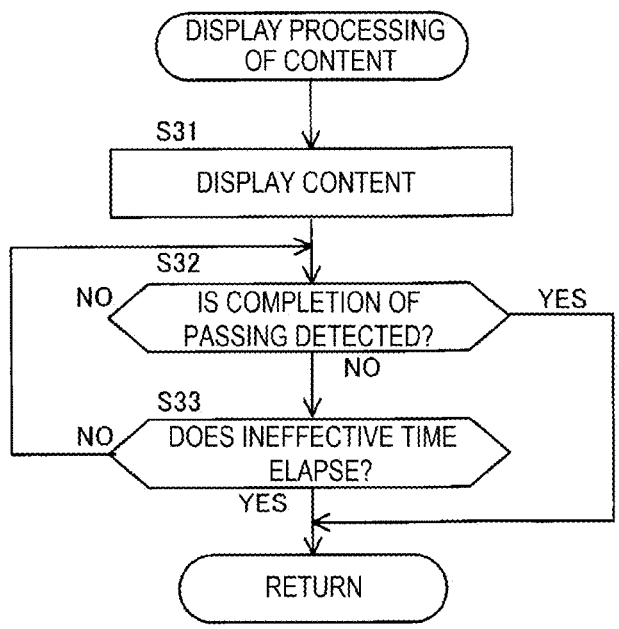
FIG. 7 is a flowchart of display processing of a content in the display method according to the first embodiment.

FIG. 7 is a flowchart of display processing of a content in the display method according to the first embodiment. At the above described step S30 in FIG. 3, as shown in FIG. 7, first, at step S31, the display control unit 33*c* controls the display apparatus 10 to display the content in the orientation determined by the above described determination unit 33*b* as the image G. The display is started with timing of a lapse of a predetermined time td from the first time t1 or the second time t2. The predetermined time td is appropriately determined according to the above described distances d1, d2.

Then, at step S32, the display control unit 33*c* determines whether the human H completes passing to the region between the first position P1 and the second position P2 based on the output of the sensor 20. The determination is made based on whether the output of the second sensor 22 changes when the output of the first sensor 21 is acquired at the above described step S10 in FIG. 3 and, on the other hand, based on whether the output of the first sensor 21 changes when the output of the second sensor 22 is acquired at the above described step S10 in FIG. 3.

When the output of the sensor 20 is not further acquired (S32: NO), at step S33, the display control unit 33*c* determines whether an ineffective time over a predetermined time Tth elapses. When the ineffective time does not elapse (S33: NO), the display control unit 33*c* returns to the above described step S32. Accordingly, in a period until the ineffective time elapses or the output of the sensor 20 is further acquired, display of the image G by step S31 is not interrupted.

On the other hand, when the ineffective time elapses (S33: YES) or the output of the sensor 20 is further acquired (S32: YES), the processing device 33 goes to the above described step S40 in FIG. 3. At the same time, the first time t1 or the second time t2 stored in the memory device 32 is discarded.

Figure 8:
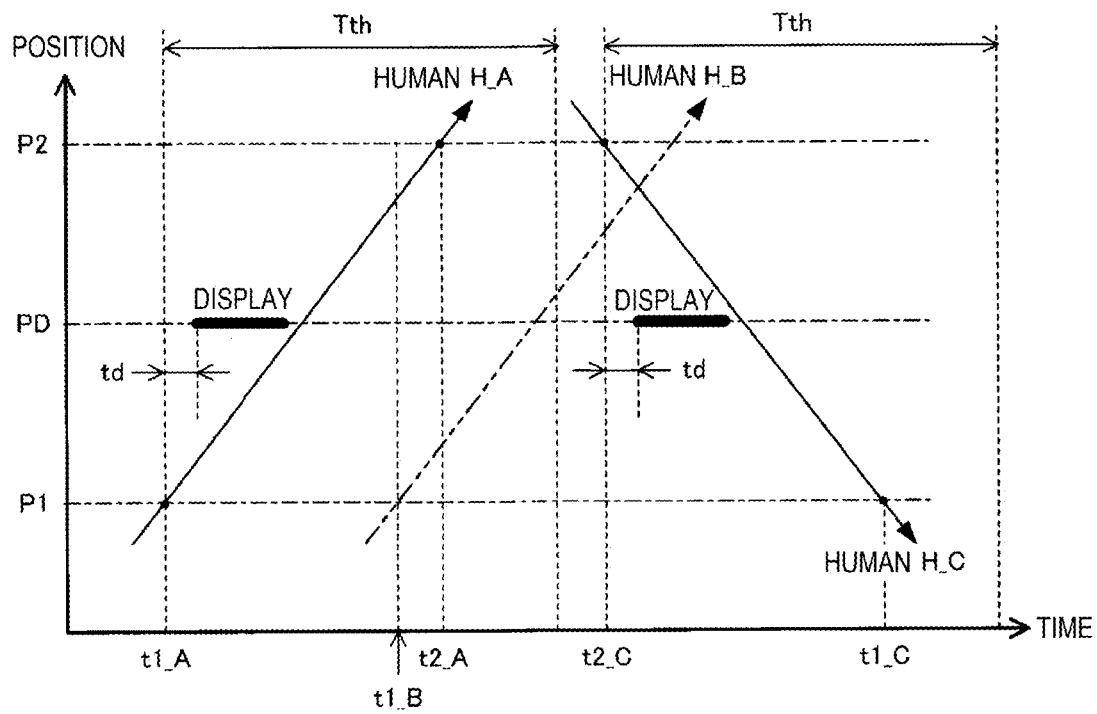
FIG. 8 is a diagram for explanation of an example of display timing by the display method according to the first embodiment.

FIG. 8 is a diagram for explanation of an example of display timing by the display method according to the first embodiment. In FIG. 8, the horizontal axis indicates the time and the vertical axis indicates the position, and respective relationships between the positions and the times of a human H_A, a human H_B, and a human H_C are shown. Here, the respective human H_A and human H_B are humans H moving from the first position P1 toward the second position P2 via the display position PD. Note that a first time t1_A when the human H_A passes through the first position P1 is before a first time t1_B when the human H_B passes through the first position P1. The first time t1_B is before the predetermined time Tth elapses from the first time t1_A. Further, the human H_C is a human H moving from the second position P2 toward the first position P1 via the display position PD. Note that a second time t2_C when the human H_C passes through the second position P2 is after the predetermined time Tth elapses from the first time t1_A. In FIG. 8, "_A" is added to the signs of the elements corresponding to the human H_A and "C" is added to the signs of the elements corresponding to the human H_C.

As shown in FIG. 8, when the human H_A passes through the first position P1 at the first time t1_A, display of the image G is started after the predetermined time td elapses from the first time t1_A. Here, in a period from the first time t1_A to the second time t2_A when the human H_A passes through the second position P2, even when the human H_B passes through the first position P1, display of the image G because of the passing is not performed and the display of the image G because of the passing of the human H_A through the first position P1 is not interrupted. Further, if the human H_A passes through the first position P1, and then, returns without going to the second position P2, when the predetermined time Tth elapses, new display of the image because of the passing of the human H to the first position P1 or the second position P2 is permitted.

After the predetermined time Tth elapses from the first time t1_A or after the second time t2_A when the human H_A passes through the second position P2, new display of the image G because of the passing of the human H through the first position P1 or the second position P2 is permitted. In the example shown in FIG. 8, after the second time t2_A when the human H_A passes through the second position P2, when the human H_C passes through the second position P2 at the second time t2_C, display of the image G is started after the predetermined time td elapses from the second time t2_C. Here, in a period from the second time t2_C to the first time t1_C when the human H_C passes through the first position P1, even when another human H passes through the second position P2, display of the image G because of the passing is not performed and the display of the image G because of the passing of the human H_C passing through the second position P2 is not interrupted.

As described above, the display method according to the first embodiment includes step S10, step S20, and step S30. Step S10 acquires the output corresponding to the movement direction of the human H toward the display position PD where the display apparatus 10 displays the image G based on the content using the sensor 20. Step S20 determines the orientation of the image G used for alert based on the output corresponding to the movement direction of the human H. Step S30 displays the image G in the display position PD in the orientation using the display apparatus 10.

In the above described display method, the orientation of the image G used for alert is determined based on the movement direction DR1 or the movement direction DR2 of the human H to the display position PD, and thereby, the image G may be displayed in the appropriate orientation for the human H.

Further, as described above, step S20 includes determining the image G based on the output corresponding to the movement direction of the human H. Accordingly, the image G with the appropriate content for the human H may be displayed.

Furthermore, as described above, the sensor 20 includes the first sensor 21 outputting the first signal indicating detection of the passing of the human H through the first position P1 and the second sensor 22 outputting the second signal indicating detection of the passing of the human H through the second position P2 different from the first position P1. The display position PD is placed between the first position P1 and the second position P2. Step S20 includes the above described step S21 to step S24. Steps S21, S22 set the orientation of the image G to the orientation in the movement direction DR1 as an example of "first orientation" when the first signal of the first sensor 21 is acquired. Steps S23, S24 set the orientation of the image G to the orientation in the movement direction DR2 as an example of "second orientation different from the first orientation" when the second signal of the second sensor 22 is acquired.

As described above, the first sensor 21 and the second sensor 22 are used, and thereby, the orientation of the content may be appropriately determined based on the acquisition of the output of one of the first sensor 21 and the second sensor 22. Further, compared to a case using an imaging device as the sensor 20, the configuration of the sensor 20 is simpler and image processing for obtaining the output corresponding to the movement direction is unnecessary, and there is an advantage that the acquisition of the output corresponding to the movement direction is quick and accurate and the configuration of the control apparatus 30 is simple.

The above described display method is performed using the display system 1 in the above described manner. The display system 1 includes the display apparatus 10, the sensor 20 outputting in response to the movement direction of the human H toward the display position PD of the display apparatus 10, and the control apparatus 30 controlling the operation of the display apparatus 10 based on the output corresponding to the movement direction. Further, the control apparatus 30 executes the above described step S10, step S20, and step S30.

2. Second Embodiment

As below, a second embodiment will be explained. The configurations in common with the first embodiment have the same signs as those of the configurations and the explanation thereof is omitted. As below, the explanation will be made with a focus on the items different from those of the above described first embodiment and the explanation of the same items will be omitted.

Figure 9:
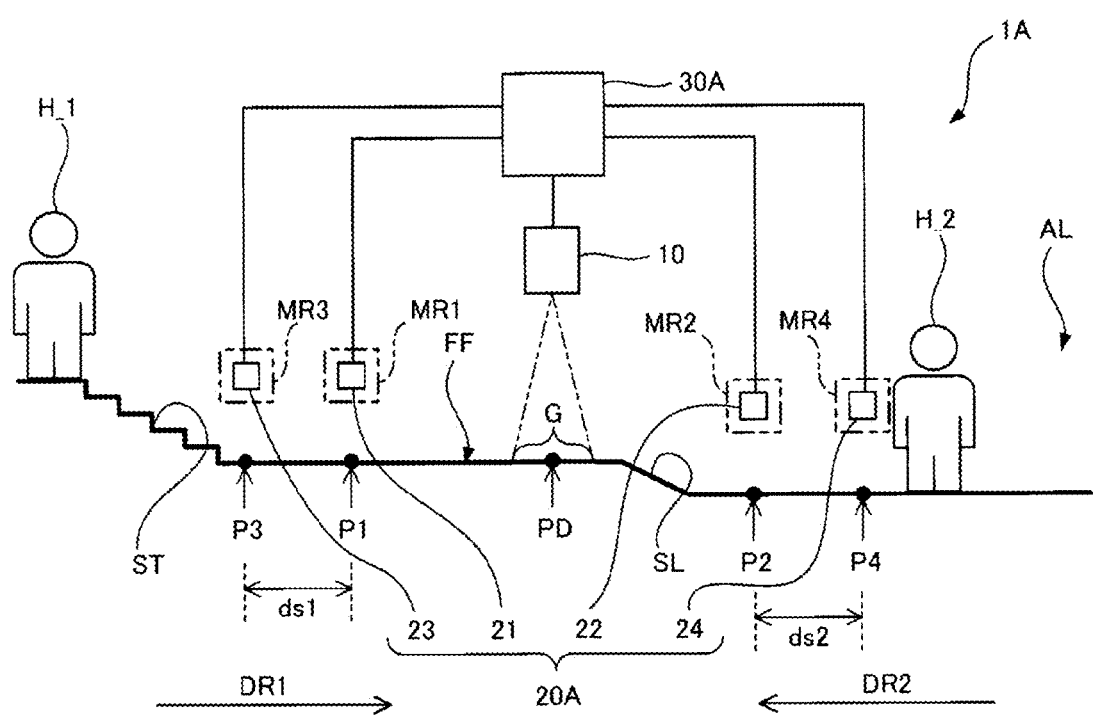
FIG. 9 is a schematic diagram of a display system according to a second embodiment.

FIG. 9 is a schematic diagram of a display system 1A according to the second embodiment. The display system 1A has the same configuration as the above described display system 1 of the first embodiment except that a sensor 20A is provided in place of the sensor 20 and a control apparatus 30A is provided in place of the control apparatus 30.

The sensor 20A has the same configuration as the sensor 20 of the first embodiment except that a third sensor 23 and a fourth sensor 24 are added. The respective third sensor 23 and fourth sensor 24 are sensors such as photoelectronic sensors and attached to one wall of the pair of left and right walls of the aisle AL like the first sensor 21 or the second sensor 22.

Here, the third sensor 23 is placed in the third position P3 between the first position P1 and the steps ST. The fourth sensor 24 is placed in a fourth position P4 located on the right of the second position P2 in FIG. 9. Therefore, the second position P2 is a position between the slope SL and the fourth position P4.

In the example shown in FIG. 9, a reflector MR3 is provided to face the third sensor 23 and a reflector MR4 is provided to face the fourth sensor 24 on the other wall of the pair of walls. The respective reflectors MR3, MR4 are structures having light reflectivity such as corner cube arrays. The reflector MR3 reflects the light from a light emitting element of the third sensor 23 toward a light receiving element of the third sensor 23. Similarly, the reflector MR4 reflects the light from a light emitting element of the fourth sensor 24 toward a light receiving element of the fourth sensor 24. For example, when no object is present in the third position P3, the third sensor 23 outputs a high-level signal and, when an object is present in the third position P3, outputs a low-level signal. The low-level signal output when an object is present in the third position P3 corresponds to a third signal. Similarly, for example, when no object is present in the fourth position P4, the fourth sensor 24 outputs a high-level signal and, when an object is present in the fourth position P4, outputs a low-level signal. The low-level signal output when an object is present in the fourth position P4 corresponds to a fourth signal.

In the above described sensor 20, when the human H_1 moves from the third position P3 to the first position P1, the movement speed of the human H_1 toward the display position PD may be obtained based on a time difference between timing of detection of passing of the human H_1 by the third sensor 23 and timing of detection of passing of the human H_1 by the first sensor 21. Similarly, when the human H_2 moves from the fourth position P4 to the second position P2, the movement speed of the human H_2 toward the display position PD may be obtained based on a time difference between timing of detection of passing of the human H_2 by the fourth sensor 24 and timing of detection of passing of the human H_2 by the second sensor 22.

The control apparatus 30A has the same configuration as the control apparatus 30 of the first embodiment except that a function of determining display timing of the image G based on the movement speed of the human H and displaying the image G with the determined timing is added.

The control apparatus 30A acquires the output corresponding to the movement speed of the human H_1 or the human H_2 toward the display position PD using the sensor 20A.

More specifically, when acquiring the output corresponding to the movement speed of the human H_1, the control apparatus 30A acquires the output of the first sensor 21 and the third sensor 23 and calculates a time difference ts1 between the first time t1 when acquiring the output of the first sensor 21 and a third time t3 when acquiring the output of the third sensor 23. Then, the control apparatus 30A stores respective information of the first time t1, the third time t3, and the time difference ts1 in the memory device 32.

Here, the first time t1 is a time when the human H passes through the first position P1. The third time t3 is a time when the human H passes through the third position P3. The time difference ts1 is a time length when the human H_1 moves from the third position P3 to the first position P1. A distance ds1 between the first position P1 and the third position P3 is fixed and the time difference ts1 changes in response to a movement speed s1 of the human H from the third position P3 to the first position P1. The movement speed s1 is calculated using a relationship $s1=ds1/(t1-t3)$.

Similarly, when acquiring the output corresponding to the movement speed of the human H_2, the control apparatus 30A acquires the output of the second sensor 22 and the fourth sensor 24 and calculates a time difference ts2 between the second time t2 when acquiring the output of the second sensor 22 and a fourth time t4 when acquiring the output of the fourth sensor 24. Then, the control apparatus 30A stores respective information of the second time t2, the fourth time t4, and the time difference ts2 in the memory device 32.

Here, the second time t2 is a time when the human H passes through the second position P2. The fourth time t4 is a time when the human H passes through the fourth position P4. The time difference ts2 is a time length when the human H_2 moves from the fourth position P4 to the second position P2. A distance ds2 between the second position P2 and the fourth position P4 is fixed and the time difference ts2 changes in response to a movement speed s2 of the human H from the fourth position P4 to the second position P2. The movement speed s2 is calculated using a relationship $s2=ds2/(t2-t4)$.

Further, the control apparatus 30A determines a content used for alert and timing of display of the content as the image G based on the output from the sensor 20A. More specifically, the control apparatus 30A determines the content and the timing corresponding to the time difference ts1 or the time difference ts2 based on the output from the sensor 20A.

Furthermore, the control apparatus 30A displays the determined content as the image G with the determined timing in the display position PD using the display apparatus 10.

Figure 10:
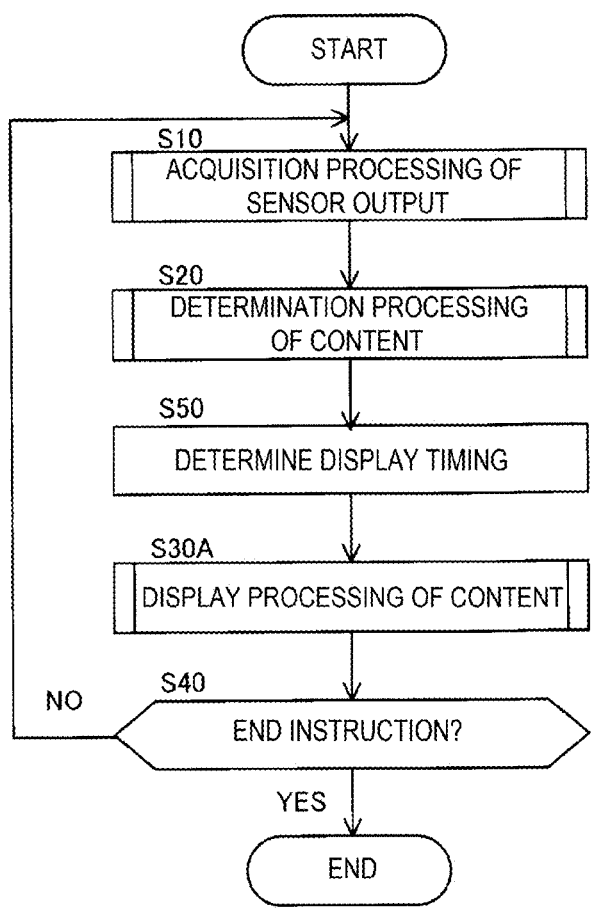
FIG. 10 is a flowchart of a display method according to the second embodiment.

FIG. 10 is a flowchart of a display method according to the second embodiment. The display method of the embodiment is the same as the above described display method of the first embodiment except that step S30A is provided in place of step S30 and step S50 is added.

In the embodiment, after step S20, at step S50, the control apparatus 30A determines display timing of the image G. The determination is made based on the time difference ts1 or the time difference ts2 as described above.

Then, at step S30A, the control apparatus 30A controls the display apparatus 10 to display the image G. The display is performed with the display timing determined at step S50. After step S30A, the control apparatus 30A goes to step S40.

Figure 11:
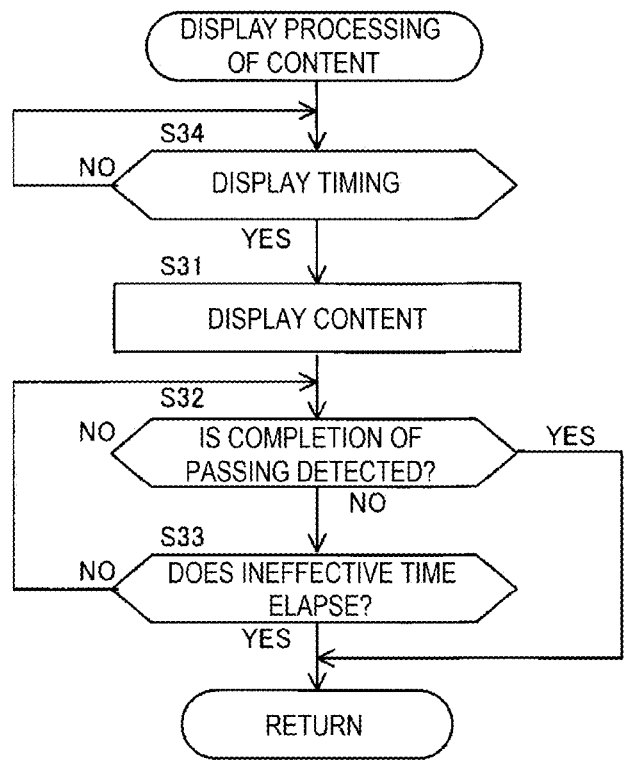
FIG. 11 is a flowchart of display processing of a content in the display method according to the second embodiment.

FIG. 11 is a flowchart of display processing of the content in the display method according to the second embodiment. The above described step S30A shown in FIG. is the same as step S30 of the first embodiment except that step S34 is added as shown in FIG. 11.

At the above described step S30A shown in FIG. 10, first, at step S34, the control apparatus 30A determines whether the display timing determined at step S50 in FIG. is reached. The determination is made until the display timing is reached and, when the display timing is reached (S34: YES), the control apparatus 30A goes to step S31. Accordingly, the image G is displayed with the display timing determined at step S50.

According to the above described second embodiment, the image G may be displayed in the appropriate orientation for the human H toward the display position PD. The display method of the embodiment further includes step S50 as described above. Step S50 determines display timing of the image G based on the movement speed of the human H toward the display position PD. Here, step S10 includes acquiring the output corresponding to the movement speed and the above described step S30A includes displaying the determined image G with the determined timing using the display apparatus 10. Accordingly, the image G may be displayed with the appropriate timing for the human H.

In the embodiment, as described above, the sensor 20A includes the third sensor 23 and the fourth sensor 24 in addition to the first sensor 21 and the second sensor 22. The third sensor 23 outputs the third signal indicating detection of passing of the human H through the third position P3 different from the first position P1 and the second position P2. The fourth sensor 24 outputs the fourth signal indicating detection of passing of the human H through the fourth position P4 different from the first position P1, the second position P2, and the third position P3. Here, the first position P1 is located between the third position P3 and the display position PD. The second position P2 is located between the fourth position P4 and the display position PD. In the above described manner, the time differences between the times of acquisition of the output of the respective sensors are used, and thereby, the display timing of the content used for alert may be appropriately determined. Further, compared to a case using an imaging device as the sensor 20A, the configuration of the sensor 20A is simpler and image processing for obtaining the output corresponding to the movement speed of the human H is unnecessary, and there is an advantage that the acquisition of the output corresponding to the movement speed is quick and accurate and the configuration of the control apparatus 30A is simple.

3. Modified Examples

The respective embodiments exemplified as above may be modified in various forms. Specific modifications that may be applied to the above described respective embodiments will be exemplified as below. Two or more forms arbitrarily selected from the following exemplifications may be appropriately combined to be mutually consistent.

3-1. Modified Example 1

In the above described respective embodiments, the configuration in which the sensor 20 or the sensor 20A has the first sensor 21 and the second sensor 22 is exemplified, however, not limited to the configuration. The sensor 20 or the sensor 20A may have e.g., an imaging device such as a CCD (Charge Coupled Device) image sensor or a CMOS (Complementary MOS) image sensor as long as the sensor outputs in response to the movement direction of the human H toward the display position PD. In this case, for example, the imaging device images a region including the first position P1 and the second position P2, the human H toward the display position PD is detected by image processing on the captured image by the imaging device, and the detection result is output from the sensor 20 or the sensor 20A.

3-2. Modified Example 2

In the above described respective embodiments, the configuration in which the display apparatus is the projection device is exemplified, however, not limited to the configuration. The display apparatus may be an apparatus having a liquid crystal display panel, an organic EL (electro-luminescence) panel, or the like as a display surface.

What is claimed is:

1. A display method comprising:
    acquiring output corresponding to a movement direction of a human toward a display position where a display apparatus displays an image based on a content using at least one sensor;
    determining an orientation of the image used for alert based on the output corresponding to the movement direction; and
    displaying the image in the display position in the orientation using the display apparatus.

2. The display method according to claim 1, wherein
    the determining the orientation of the image includes determining the image based on the output corresponding to the movement direction.

3. The display method according to claim 1, further comprising determining a time when displaying the image based on a movement speed of the human toward the display position, wherein
    the acquiring the output corresponding to the movement direction includes acquiring output corresponding to the movement speed, and
    the displaying the image in the orientation includes displaying the image at the time using the display apparatus.

4. The display method according to claim 1, wherein
    the at least one sensor includes
    a first sensor outputting a first signal indicating detection of passing of the human through a first position, and
    a second sensor outputting a second signal indicating detection of passing of the human through a second position different from the first position,
    the display position is positioned between the first position and the second position, and
    the determining the orientation includes
    determining the orientation to a first orientation when acquiring the first signal of the first sensor, and
    determining the orientation to a second orientation different from the first orientation when acquiring the second signal of the second sensor.

5. The display method according to claim 4, further comprising determining a time when displaying the image based on a movement speed of the human toward the display position, wherein
    the acquiring the output corresponding to the movement direction includes acquiring output corresponding to the movement speed,
    the at least one sensor includes a third sensor outputting a third signal indicating detection of passing of the human through a third position different from the first position and the second position,
    the first position is located between the third position and the display position,
    the acquiring the output corresponding to the movement speed includes determining the movement speed based on a time difference between a time when acquiring the first signal and a time when acquiring the third signal when acquiring the third signal, and
    the displaying the image includes displaying the image at the time using the display apparatus.

6. The display method according to claim 5, wherein
    the at least one sensor includes a fourth sensor outputting a fourth signal indicating detection of passing of the human through a fourth position different from the first position, the second position, and the third position,
    the second position is located between the fourth position and the display position, and
    the acquiring the output corresponding to the movement speed includes determining the movement speed based on a time difference between a time when acquiring the second signal and a time when acquiring the fourth signal when acquiring the fourth signal.

7. A display system comprising:
    a display apparatus;
    at least one sensor outputting output corresponding to a movement direction of a human toward a display position where the display apparatus displays an image based on a content; and
    a control apparatus controlling operation of the display apparatus based on the output corresponding to the movement direction, the control apparatus executing
    acquiring the output corresponding to the movement direction from the at least one sensor,
    determining an orientation of an image used for alert based on the movement direction, and
    displaying the image in the display position in the orientation using the display apparatus.

* * * * *